S. H. Lombard,
Bread Machine,
N°. 78,106.      Patented May 19, 1868.

Witnesses:
P. J. Dodge
L. Hailer

Inventor:
S. H. Lombard
by Dodge & Munn
his attys.

United States Patent Office.

S. HOWARD LOMBARD, OF WINONA, MINNESOTA.

Letters Patent No. 78,106, dated May 19, 1868.

---

IMPROVED DOUGH-KNEADER.

---

*The Schedule referred to in these Letters Patent and making part of the same.*

---

TO ALL WHOM IT MAY CONCERN:

Be it known that I, S. HOWARD LOMBARD, of Winona, in the county of Winona, and State of Minnesota, have invented certain new and useful Improvements in Machines for Kneading Dough; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to an improved "bread or pastry" board, with an attachment thereto, for kneading the dough without its being necessary to touch it with the hands.

Figure 1:
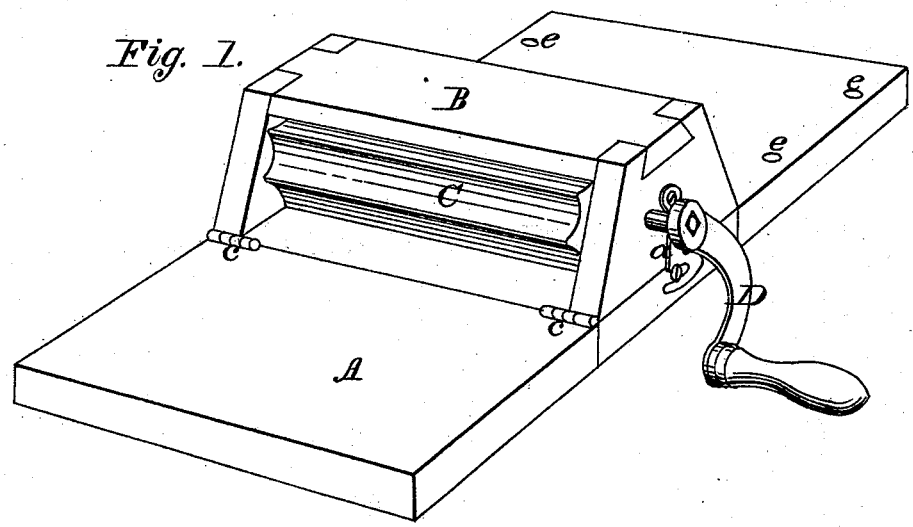

Figure 1, of the drawing, is a perspective view of my improved kneader, and

Figure 2:
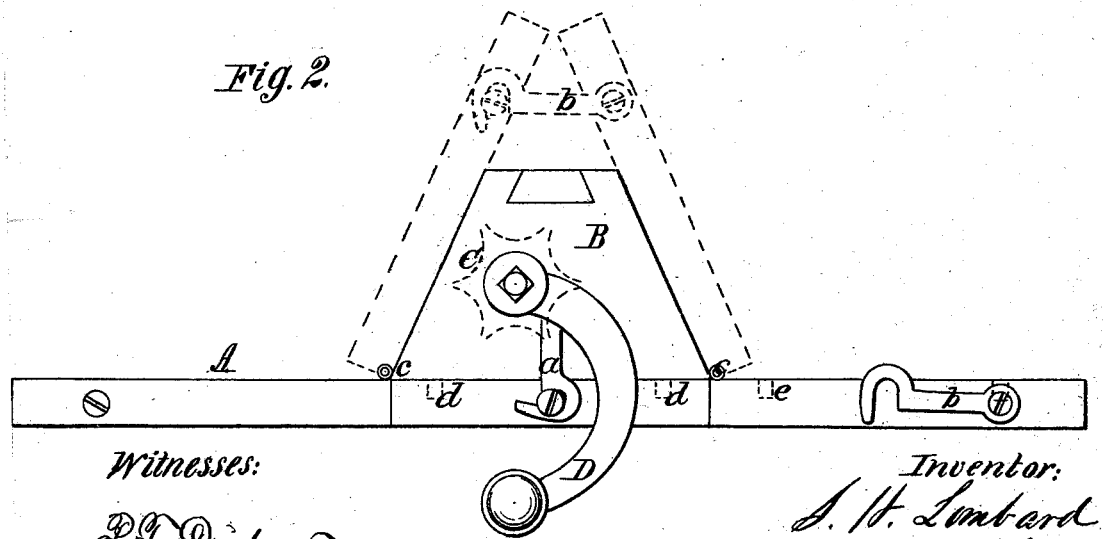

Figure 2 is a side elevation of the same, with the board shown folded up, in red lines.

A represents the kneading-board, which I construct in three sections, connected to each other by means of the hinges *c c*, as shown in figs. 1 and 2, that the board may be folded so as to occupy but little space, or unfolded, and used as an ordinary pastry-board, for kneading by hand.

I next construct a frame, B, of suitable size to sit upon one of the sections of the board A, and of a length equal to the width of the board, as shown in fig. 1. In this said frame I mount a fluted roller, C, having bearings in the end-pieces of the frame, as shown in figs. 1 and 2. One of the journals of this roller extends through the frame, and has attached to its outer end a crank, D. This crank may be permanently attached, or it may be secured by a thumb-nut, so that it may be removed when it is desired the machine should not occupy much room, or that it may not be accidentally broken off.

Two leaves or sections of the board, A, I provide with small holes, *e e*, as shown in fig. 1, and also in red lines in fig. 2, and the under sides of the end-pieces of the frame with corresponding dowel-pins, so that when frame B is set on either section of board A, and dowel-pins entered, all lateral movement of the frame is prevented. The frame is then fastened down, by means of the hooks *a*, on frame B, which are hooked under the pins on the side of the board, and the machine is ready for operation, which is as follows:

The roller-frame being attached to the middle section of board A, the crank is turned, and the dough fed under from either side, when the roller will draw the dough under, and work it, with a motion very closely resembling that of the human hand. The dough will pass out under on the opposite side of the roller, when it may be lifted up over the roller, and fed through again from the same side, or the motion of the roller may be reversed each time, and the dough fed back and forth from one side to the other.

When it is desired to use the roller, but at the same time have more room than when the roller is secured to the middle of the board, it may be taken off and attached to the end section, which will give room on the board to cut up the dough, and form the loaves, &c., which are afterwards run through singly.

After the kneading of the "batch," and it is desired to place the machine away until the next occasion requiring its use, the frame is secured to the middle section of the board, and the other leaves are folded up against it, as shown in red lines, and are held there by the hooks *b* on the leaf.

By this construction of apparatus, I am enabled to furnish a very simple and efficient kneader and board combined, one which occupies but little room, and all the parts of which are easy of access, for the purpose of cleaning it, &c., &c.

Having thus fully described my apparatus, what I claim as my invention, and desire to secure by Letters Patent, is—

The sectional hinged board A, having the detachable frame B, and roller C, arranged for use therewith, substantially as shown and described.

S. HOWARD LOMBARD.

Witnesses:
 JACOB STORY,
 SAMUEL FOX.